United States Patent [19]

Mukai

[11] 4,411,038

[45] Oct. 25, 1983

[54] PNEUMATIC CLEANING SYSTEM

[76] Inventor: Shinichi Mukai, 2411 22nd Ave., Kingsburg, Calif. 93631

[21] Appl. No.: 321,682

[22] Filed: Nov. 16, 1981

[51] Int. Cl.[3] .......... A23N 12/00

[52] U.S. Cl. .......... 15/3.13; 15/306 B; 15/308; 15/346; 209/466

[58] Field of Search .......... 15/3.13, 306 B, 306 R, 15/308, 345, 346; 209/466, 394

[56] References Cited

U.S. PATENT DOCUMENTS

| | | | |
|---|---|---|---|
| 2,275,849 | 3/1942 | Fraser | 209/466 |
| 2,666,711 | 1/1954 | Crossett | 15/3.13 X |
| 3,096,532 | 7/1963 | Frank | 15/308 X |
| 3,398,423 | 8/1968 | Miller | 15/306 B |
| 3,805,316 | 4/1974 | Sheppard | 15/346 X |
| 3,909,873 | 10/1975 | Minasov et al. | 15/306 B |
| 4,198,725 | 4/1980 | Trutzschler | 15/345 X |

FOREIGN PATENT DOCUMENTS

| | | | |
|---|---|---|---|
| 2364409 | 6/1975 | Fed. Rep. of Germany | 15/306 B |

*Primary Examiner*—Chris K. Moore
*Attorney, Agent, or Firm*—Huebner & Worrel

[57] ABSTRACT

A pneumatic cleaning system for particulate bulk material such as raisins, seeds, nuts, and the like, the system having a reciprocating screen onto which the material is delivered in a layer for travel across the screen; a top hood and a bottom hood mounted in substantially airtight relation on the screen; an air cleaner; a blower having an intake and an exhaust, and conduits connecting the exhaust, the bottom hood, the intake, and the cleaner in closed circuit, series relation to pass air upwardly through the layer at the screen.

15 Claims, 5 Drawing Figures

PNEUMATIC CLEANING SYSTEM

BACKGROUND OF THE INVENTION

1. Field of the Invention

The present invention relates to a pneumatic cleaning system and more particularly to such a system for cleaning debris from particulate bulk material such as raisins, seeds, nuts and the like.

2. Description of the Prior Art

It is known to clean debris from a particulate bulk agricultural product by passing the uncleaned product along a substantially horizontal shaking screen having perforations of a size such that selected or desired articles pass over the perforations while particles of debris, which are substantially smaller than such articles, fall through the perforations. Such a screen effectively removes debris, such as small stones, which are heavier and smaller than the selected articles. It is evident that such a screen, which utilizes the fact that particles of debris are relatively smaller than desired articles, cannot separate debris which has a larger dimension than the desired articles. Further, since conventional shaking screens rely on gravity for separation, it is evident that separation is more effective for debris which has a specific gravity substantially greater than that of the articles of the desired product. It is also evident that other well-known cleaning methods, such as flotation, cannot separate debris which has a lower specific gravity, from the desired product of a higher specific gravity.

It has long been known to clean debris having a substantially lower specific gravity from a desired particulate product of a greater specific gravity by applying a stream of air to the uncleaned material. Such separation is effective when the desired product has a substantially higher specific gravity and is of relatively regular and streamlined form, as when separating chaff from grain. However, such separation is, of course, substantially less effective when the debris and the product are more nearly alike in form, in resistance to air flow, and/or in specific gravity.

An example of the deficiencies of such shaking screen separation is found in raisin processing where stems and substandard raisins are intermixed by nature with raisins of the desired quality. The stems are present in two forms. One form is "cap stems" which are short and of small diameter and which originally served to attach individual grapes to their bunches. The other form is "vine stems". Vine stems are larger stems which, originally, united bunches of grapes and connected the bunches with their vines. After grapes are dried into raisins, stems of both forms have a substantially lower specific gravity than raisins. The sub-standard raisins are, frequently, of irregular shape and approach dried grape skins in consistency and are thus also of lower specific gravity than the desired raisins. Conventional shaking screens, which rely on gravity, as before stated, are not fully effective in removing cap stems and those sub-standard raisins which are smaller than desired raisins even though debris of these two types if of smaller dimensions than the desired raisins. Further, conventional shaking screens are ineffective for separating vine stems, which are often of a branching configuration and have at least one dimension which is at least equal to and, frequently greater than, any dimension of the desired raisins. It is also evident that conventional shaking screens cannot effectively separate those sub-standard raisins which, as is commonly the case, are of a flattened configuration and of greater dimensions than the desired raisins.

With raisins, the need for an improved cleaning system is greatest toward the end of the present mechanical cleaning process where the raisins are, in fact, marketable by present standards, but still contain a substantial amount of debris in the form of sub-standard raisins and vine stems. At present, manual picking of vine stems and the like is required to obtain raisins of the highest freedom from debris after mechanical cleaning is substantially complete. Such manual picking is not only relatively expensive but, at best, is relatively inefficient since it is easy to overlook the debris to be removed.

PRIOR ART STATEMENT

In conformance with 37 C.F.R. §1.97 and §1.98, the applicant states that he is not aware of any prior art, other than that discussed above, which is relevant to the patentability of the subject invention.

SUMMARY OF THE INVENTION

It is an object of the present invention to provide an improved pneumatic cleaning system for removing debris from particulate bulk material such as raisins, seeds, nuts, and the like.

Another object is to provide such a system which is fully effective in removing from such material particles of debris which are of lower specific gravity than particles of desired material intermixed therewith.

Another object is to provide such a system which does not contaminate the environment with particles of removed debris or selected particulate material.

Another object is to provide such a system which provides a cleaned product which is substantially cleaner than is required by existing marketing standards.

Another object is to provide such a system which is particularly effective in commercial separation of "vine stems" from raisins.

A further object is to provide improved elements and arrangements thereof in such a system which is fully effective in performing its intended function, simple, economical and durable.

DESCRIPTION OF THE PREFERRED EMBODIMENT

Figure 1:
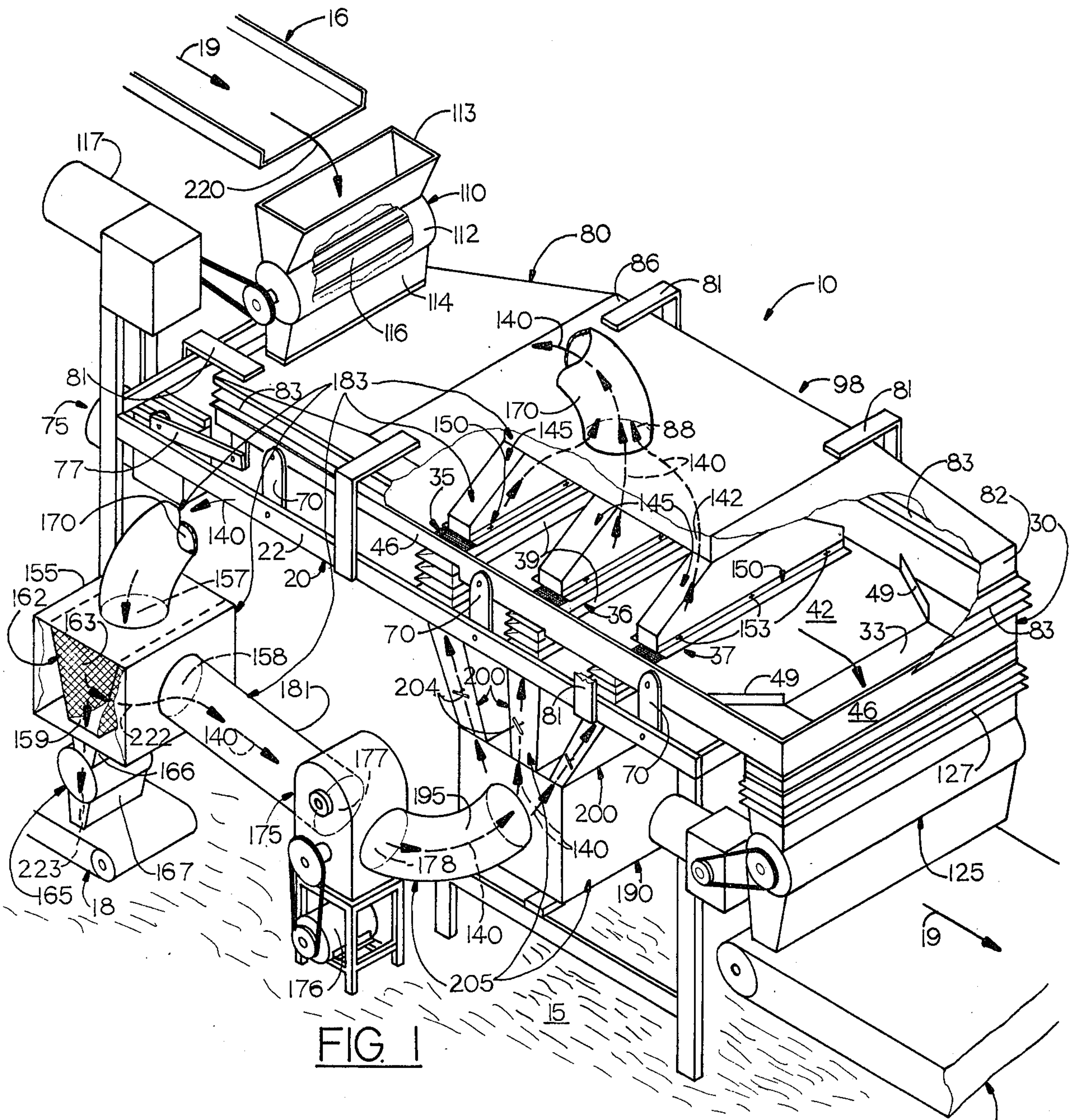
FIG. 1 is a perspective view of a pneumatic cleaning system embodying the principles of the present invention, portions of the system being broken away for illustrative convenience and to show interior elements.

Referring with greater particularity to the drawings, in FIG. 1 is shown a pneumatic cleaning system, which is indicated generally by the numeral 10, for particulate bulk materials. The system is especially useful in cleaning debris in the form of the described vine stems from raisins. However, it is to be understood that the system is also effective in cleaning a wide variety of debris from raisins, seeds, nuts, and the like.

The system is shown mounted on a floor 15 and associated with three fragmentarily represented belt conveyors, an input conveyor 16 to supply material to be cleaned to the system; an output conveyor 17 to receive the cleaned, desired product from the system; and a debris conveyor 18 to remove the debris separated by the system. The input and output conveyors are aligned longitudinally in a conveying direction indicated by arrows 19. The adjacent ends of the conveyors are spaced longitudinally thereof, with such end of the input conveyor being disposed substantially upwardly of such end of the output conveyor. The debris conveyor is adjacent to the floor and is disposed at one side of the input conveyor.

The system includes a framework 20 of any suitable construction which serves to mount the other elements of the system on the floor 15 in relation to the conveyors 16, 17, and 18. The framework includes a pair of horizontally extended and spaced parallel rails 22 extended generally between the adjacent ends of the input conveyor and the output conveyor.

The system 10 has a horizontally elongated, rectangular shaker pan 30 which extends between and somewhat above the rails 22. The pan has an input end portion 31 disposed below the input conveyor 16 and has an output end portion 32 disposed above the output conveyor 17 and provided with a horizontal, rectangular outlet opening 33. The bottom of the pan has three planar horizontal portions which extend through three corresponding cleaning stations 35, 36, and 37 disposed in succession between the input portion and the output portion. The floor of the input portion and one of the horizontal portions adjacent thereto are contiguous and coplanar. The pan has a pair of steps or stepdowns 39 disposed between the horizontal portions of adjacent cleaning stations. The stepdowns are arranged so that the elevations of the stations are successively somewhat lower in a direction toward the output portion. The pan has a periphery 41, an upper side 42, and a lower side 43. The pan has an upright rectangular rim 46 extending about its periphery from the level of the lowest cleaning station to an elevation above the highest cleaning station. The rim thus confines material deposited on the pan at the input portion for movement along the pan toward its output portion in a direction of travel indicated by the arrows 48. The pan has a pair of vertical planar deflectors 49 extended individually and angularly from the rim toward the corners of the outlet opening which are disposed toward the input portion.

Figure 3:
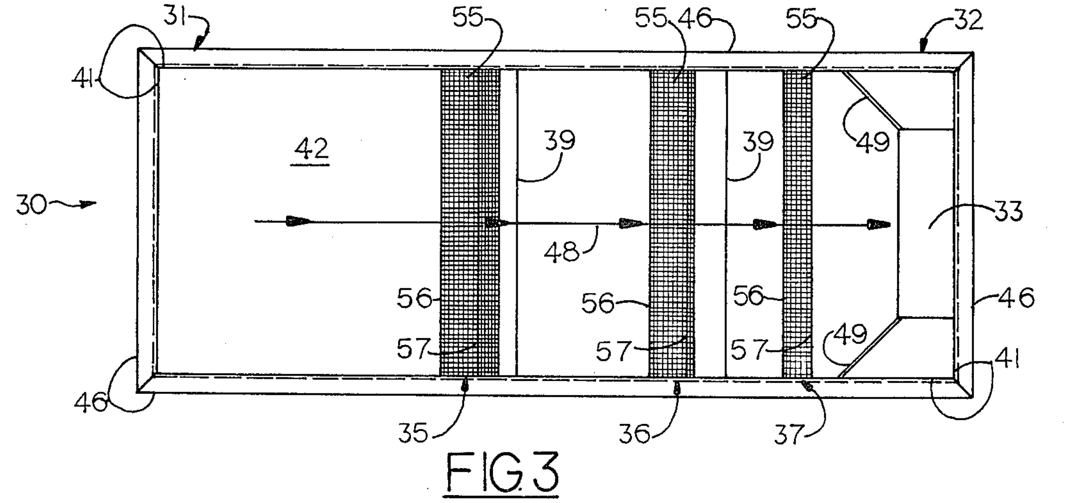
FIG. 3 is a horizontal section through the system taken on line 3—3 of FIG. 2.

The pan 30 has three rectangular screens 55 individual to the cleaning stations 35, 36, and 37. Each screen extends transversely across the pan between opposite sides of the rim 46. The screens are substantially shorter longitudinally of the pan than transversely thereof, and each screen has one end 56 disposed toward the input portion 31 and an opposite end 57 disposed toward the output portion 32. These ends of the screens are successively more closely spaced in the direction 48 as shown in FIG. 3. The mesh of each screen is such that raisins of the desired quality cannot pass through the screen. It is apparent that each screen is a perforate section of the pan disposed between a pair of imperforate sections of the pan, and that each such pair of imperforate sections is disposed individually at the sides of the corresponding cleaning station and is contiguous with the screen at such station. It is evident that each screen extends transversely of a line between these sides of its respective station and that these sides are opposite of the screen along such line. The screens are, therefore, spaced in a direction along such line and the line extends along the direction 48. It is also evident that each stepdown 39 extends transversely of such line and is downwardly along the pan in such direction.

The pan 30 is mounted on the framework 20 for substantially horizontal reciprocation, together with its screens 55, in a direction parallel to the direction 48 by a plurality of links 70. Half of the links are pivoted at their lower ends to each of the rails 22 and the upper ends of the links are pivoted to the corresponding longitudinal side of the rim 46. The links are pivoted about horizontal axes extended transversely of the pan. The links are generally upright and the pan is continuously reciprocated by a power drive 75 mounted on the framework beneath the input conveyor 16. This drive is interconnected with the pan by a connecting rod 77 and reciprocates the pan with a relatively short stroke so that the elevation of the pan does not vary substantially and it remains substantially horizontal as it reciprocates. The drive is of well-known type which reciprocates the pan with a motion that motivates particulate bulk material deposited on the input portion 31 to travel in the direction 48 as a result of the reciprocation. The material thus travels from the end 56 of each screen toward its end 57.

The system 10 includes a top hood 80 fixedly mounted on the frame 20 in any suitable manner, as by brackets 81, above the upper side 42 of the pan 30 and the screens 55. The hood has an open rectangular lower end 82 which is substantially congruent with the periphery 41 of the pan and which is aligned therewith and spaced somewhat thereabove. The lower end of the hood and the periphery of the pan are interconnected in substantially airtight relation by a bellows 83 which is wrapped peripherally about these elements and which has upper and lower ends secured respectively thereto in any suitable manner. The bellows permits the pan to reciprocate in relation to the hood while connecting the hood and pan in air-tight relation. It is apparent that the hood horizontally circumscribes the pan and the screens. Longitudinally of the pan, the hood has a central hump 86 having a circular, upwardly disposed opening 88 therein for a purpose subsequently to be explained. The hood extends oppositely and downwardly from the hump toward the input portion 31 and the output portion 32 of the pan. The hood is provided with a rectangular input opening 95 extended transversely of the pan and disposed vertically between the input portion and the input conveyor 16. It is evident that, at each of the cleaning stations 35, 36, and 37, the hood extends oppositely of the corresponding screen at the sides of the station. The openings 88 and 95 are closed in substantially air-tight relation by elements of the system 10 yet to be described. The hood and pan thus define a substantially air-tight enclosure 98 across which the pan horizontally extends.

The system 10 includes a first or input air lock 110 of well-known construction. This air lock is fixedly mounted on the framework 20 and extends vertically in a direction between the input conveyor 16 and the input opening 95. The air lock has a central cylindrical portion 112 whose axis is horizontal and extends transversely of the pan 30. This portion opens upwardly into a hopper 113 disposed below the adjacent end of the input conveyor and opens downwardly into a chute 114 which conforms to the input opening and is fixed in substantially air-tight relation thereto. The cylindrical portion is provided with a coaxial paddle wheel 116 having flexible paddle elements which inwardly engage the cylindrical portion. The wheel is continuously rotated by a power drive 117 so that material deposited from the conveyor is carried, as the wheel rotates, in the spaces between adjacent elements and released into the chute for deposit onto the input portion 31 of the pan through the input opening. As each paddle passes the hopper or the chute, the paddle forms a substantially air-tight seal with the cylindrical portion thereby minimizing movement of air to or from the enclosure as material is delivered to the pan. It is evident that the air lock opens through the hood and is disposed at the side of each of the cleaning stations 35, 36, and 37 which is at the one end 56 of the corresponding screen.

The system 10 includes a second or outlet air lock 125 which is mounted on the framework 20 and is similar in construction to the input air lock 110. The outlet air lock is disposed between the output opening 33 and the adjacent end of the output conveyor 17 with the chute of the outlet air lock terminating above this conveyor end. The outlet lock has a bellows 127 interconnecting its hopper and the outlet opening. The outlet lock thus opens through the pan 30 and is disposed below the pan 30 to receive material from the output portion 32 thereof and to deposit the material externally of the enclosure 98 onto the output conveyor. It is apparent that the outlet lock is disposed at the other side of each of the cleaning stations 35, 36, and 37 from the side thereof to which material to be cleaned is delivered by the input air lock.

The system 10 has a closed air circulating circuit through which air circulates as indicated by the numeral 140. This circuit includes a vacuum box 142 fixedly mounted on the hood 80. The vacuum box is disposed within the hump 86 and communicates with the opening 88. The system has three rigid vacuum or inlet ducts 145 of rectangular cross section. Each duct has an upper end 146 which communicates with the vacuum box. Each duct extends downwardly within the hood from such box to a lower end individual to one of the screens 55, terminating at a rectangular opening 147. This opening is approximately congruent with the corresponding screen, is substantially aligned with the screen, and is upwardly spaced therefrom. It is evident that each opening is disposed in juxtapositioned, circumscribing relation to the corresponding screen. Since the hood circumscribes the screens and since the hood is connected in substantially air-tight relation to the pan, it is evident that the hood also circumscribes the openings 147 and is connected in substantially air-tight relation to the inlet ducts at their upper ends by the vacuum box.

The lower end of each duct has a pair of vertically adjustable gates or movable barriers 150 extended transversely of the pan and disposed oppositely of the lower end along the direction 48. Each gate is L-shaped. One leg of the gate is substantially parallel to the pan 30 and extends outwardly from the duct and the other leg is flatly engaged with the corresponding side of the duct which extends transversely of the pan. The last mentioned legs are provided with vertical slots 152 provided with individual stud and wing nut assemblies 153 which are fixedly mounted on the duct. It is evident that these assemblies mount the gate on the duct adjacent to the opening 147 thereof and that each gate is adjustably movable toward and from the pan 30 by loosening the corresponding wing nuts and sliding the gate upwardly or downwardly to a desired position above the corresponding screen 55. The position of the opening is thereby moved vertically in relation to the screen.

The air circulating circuit 140 has a vacuum plenum 155 which is of box-like configuration and is mounted on the floor 15 in any suitable manner above the debris conveyor 18. This plenum has an upwardly disposed, circular inlet opening 157, a circular side outlet opening 158, and a rectangular bottom debris opening 159. The vacuum plenum is provided with an air cleaner, indicated generally by the numeral 162, which includes a screen 163 of generally inverted frusto-pyramidal form disposed within the plenum. The upper end of the screen circumscribes the inlet opening and its lower end conforms to the debris opening. The air cleaner has a debris air lock 165, which is similar to the air locks 110 and 125. The debris air lock has a hopper 166 connected in air-tight relation to the plenum at the debris opening and has a chute 167 disposed above the debris conveyor.

The circuit 140 includes a vacuum conduit 170. This conduit is of any suitable configuration and interconnects the opening 88, and therefore the vacuum box 142, with the inlet opening 157. Such interconnection is substantially air tight in relation to the exterior of the hood 80 and the plenum 155 and provides for air flow therebetween.

The circuit 140 has a blower 175 which is power driven by a motor 176 and has an inlet 177 and an outlet 178. Although the blower may be of any suitable type, a positive displacement blower of well-known construction having the impellers of figure-eight shape rotating in opposite directions is well suited to the practice of the subject invention. The blower is disposed adjacent to the vacuum plenum 155. A conduit 181 interconnects the outlet opening 158 of the plenum with the inlet of the blower and provides for air flow therebetween. Such interconnection is substantially air tight in relation to the ambient air. It is evident that each duct 145 together with its opening 147, the vacuum box 142, the conduit 170, the plenum 155, and the conduit 181 define a generalized intake 183 for the blower, this intake extending to the blower from the cleaning stations 35, 36, and 37.

The circuit 140 has a pressure plenum 190 of box-like form mounted beneath the pan 30 and thus below the screens 55. This plenum has an inlet opening in one of its vertical sides and has three rectangular outlet openings 193 in its upper side. The circuit has a pressure conduit 195 which interconnects the blower outlet 178 and the inlet opening of the pressure plenum for air flow from the blower to the plenum. This interconnection is substantially air tight in relation to the ambient air.

Figure 2:
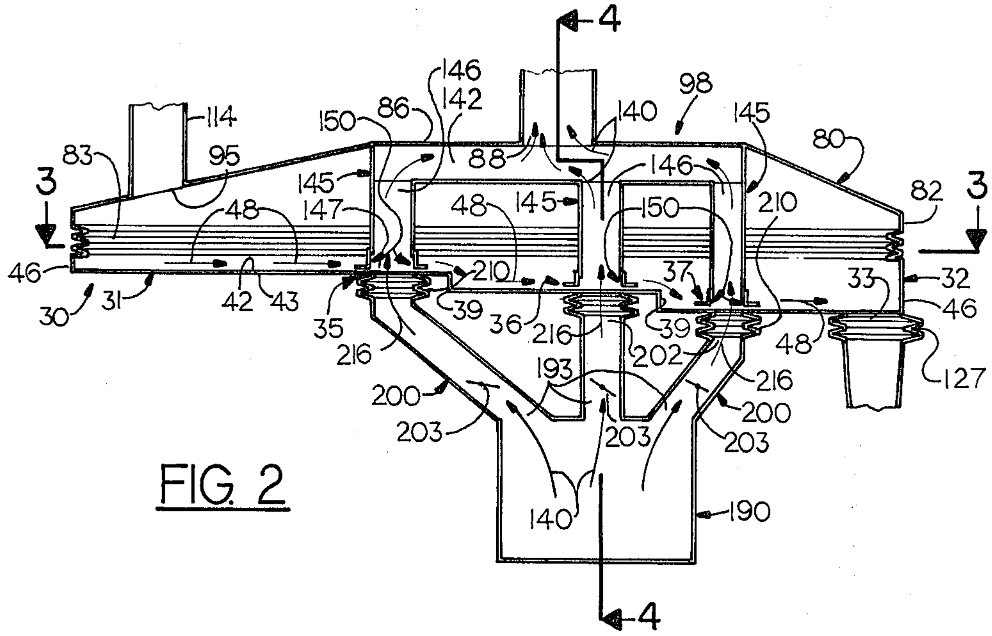
FIG. 2 is a vertical, longitudinal section of a shaker pan and related elements employed in the system.

The circuit 140 has three rigid outlet or pressure ducts 200. Each such duct has a lower end fixedly mounted on the pressure plenum 190 at a corresponding one of the outlet openings 193 for air flow from the plenum. Each such duct is connected with the plenum in substantially air-tight relation to the ambient air. Each duct extends upwardly from the plenum toward a corresponding one of the screens and terminates in an upper end 202 disposed beneath the corresponding screen. This end is rectangular and approximately congruent with the corresponding screen, is substantially aligned with this screen, and is spaced downwardly thereof. As shown in FIG. 2, each pressure duct has a damper 203 disposed therein and provided with a handle 204 external to the duct, as shown in FIG. 1, for adjustable positioning of the damper. It is evident that the conduit 195, the plenum 190, and the pressure ducts define a generalized exhaust 205 of the blower 175.

Each pressure duct 200 is provided with a bellows-like flexible top hood or conduit 210 extended between the upper end of the duct and the lower side 43 of the pan 30. This conduit is connected in any suitable manner and in substantially air-tight relation to the upper end and to the lower side. The conduit is thus mounted below the corresponding screen 55 and serves to interconnect the exhaust and the lower side in such relation. It is evident that each flexible conduit circumscribes the corresponding screen and is mounted below it in substantially air-tight relation thereto. It is also evident that the conduits accommodate the relative movement between the duct and the pan due to the reciprocation of the pan by the drive 75.

Figure 4:
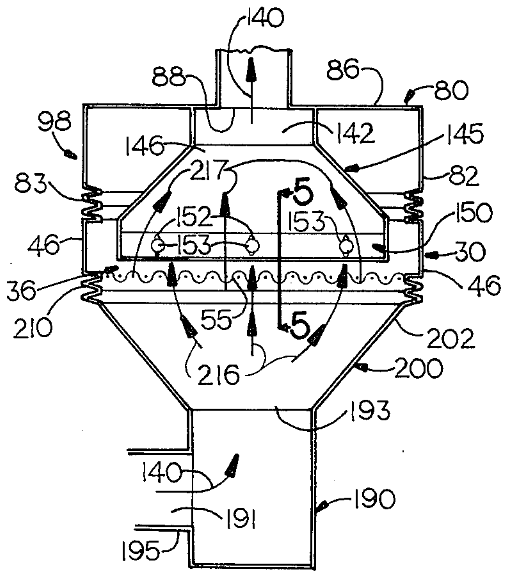
FIG. 4 is a vertical section at an enlarged scale taken on line 4—4 of FIG. 2.
Figure 5:
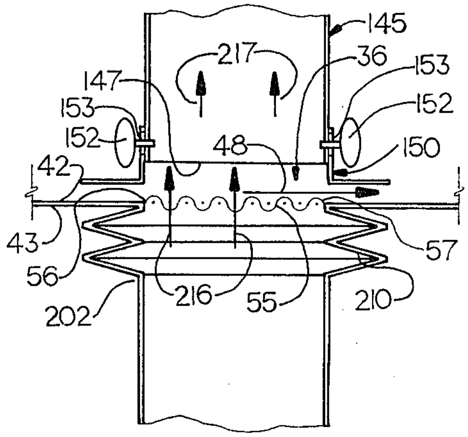
FIG. 5 is a vertical section at an enlarged scale taken on line 5—5 of FIG. 4.

In the circuit 140 it is evident that the conduits 170, 181, and 195 connect the blower outlet 178, the flexible conduits 210, the top hood 80, the air cleaner 162 and the inlet 177 of the blower 175 in substantially air-tight, series relation so that the circuit is a closed circuit in which air is recirculated by the blower from the vacuum ducts 145 to the pressure ducts 200 as indicated by the arrows. It is also evident that, at each screen 55, the recirculated air is directed upwardly by the corresponding pressure duct 200, which is included in the exhaust 205, through the screen in a stream supplied to the screen by the blower 175 and indicated by the arrows 216 in FIGS. 2, 4, and 5, this stream being delivered to the screen by the corresponding flexible conduit 210. It can be seen that, at each screen, air from the corresponding stream is drawn upwardly into the opening 147 of the corresponding vacuum duct 145, which is included in the intake 183, as indicated by the arrows 217 in FIGS. 4 and 5, the blower serving to provide a vacuum at the duct.

OPERATION

The operation of the described embodiment of the subject invention is believed clearly apparent and is briefly summarized at this point. The input conveyor 16 is operated continuously to supply particulate bulk material to be cleaned to the hopper 113 of the input air lock 110 as indicated by the arrow 220. As previously described, this material includes desired particles, typically raisins, and also contains debris, particularly vine stems, which can be lifted from the raisins by a stream of air when the material is agitated. The power drive 117 of the input air lock is energized together with the corresponding elements of the air locks 125 and 165 and the drive 75 which reciprocates the pan 30. As a result, the material is deposited by the input air lock in a layer on the pan at its input end portion 31 and the layer is motivated by the reciprocation of the pan so as to be conveyed continuously in the direction 48 through the cleaning stations 35, 36, and 37 and in an agitated condition across the screens 55.

At each of these stations, the gates 150 are adjusted, in the manner previously described, so that the leg of the gate which is parallel to the pan 30 is upwardly juxtapositioned to the layer deposited on the pan. This adjustment thus accommodates variations in thickness of such a layer as the layer moves across the corresponding screen 55 from the end 56 of the screen to its end 57. Such variations are due to the varying nature of the material and to the rate at which it is supplied by the input air lock 110. By this adjustment the openings 147 of the vacuum ducts 145 are disposed in closely adjacent upwardly spaced relation to the layer. At each of the cleaning stations 35, 36, and 37, the corresponding air stream 216 passes upwardly through the layer of material and, as a result of the stream and the agitated condition of the material, the debris is separated from the raisins and urged upwardly from the layer by the stream. As the debris moves from the layer, it is carried upwardly therefrom together with air from the stream and drawn into the corresponding vacuum duct 145. The air stream at each station thus cleans the debris from the raisins and this cleaning is facilitated by the gates 150 which confine the air stream 216 and the debris carried therein against movement along the layer longitudinally of the pan. As a result substantially all of the debris urged upwardly from the raisins at each station passes into the corresponding vacuum duct.

As the layer of material moves along the direction 48 from the station 35 toward the station 36, the layer reaches the one of the stepdowns 39 therebetween. As the layer passes over this stepdown, the material tumbles so that the material which was upwardly in the layer before it reached the stepdown is tumbled downwardly in the layer and the material which was downwardly therein is tumbled upwardly therein. As a result vine stems which were downwardly disposed in the layer and could not be carried upwardly therefrom at the station 35 by the corresponding air stream 216, now tend to be disposed upwardly in the layer and can be urged therefrom at the station 36 and carried into the corresponding vacuum duct. The stepdown between the cleaning stations 36 and 37 again tumbles the layer as it moves along the pan to allow debris not previously cleaned from the layer to be carried into the vacuum duct at the station 37.

The debris removed from the material at the cleaning stations 35, 36, and 37 and carried into the vacuum ducts 145 is subsequently carried through the vacuum box 142 and the conduit 170 with the air circulating in the circuit 140 into the air cleaner 162. In the cleaner, the air passes through the screen 163, as indicated by the arrow 222, and toward the blower 175 while the debris travels, as indicated by the arrow 223, downwardly within the screen into the debris air lock 165 and is deposited thereby on the debris conveyor 18 for disposal. After separation of the debris in the air cleaner, the air continues to the blower and is recirculated thereby in the circuit 140. Since this circuit is substantially air tight and since the agitation of the material and the passage of the air streams 216 therethrough occur within the substantially air-tight enclosure 98, debris being separated from the material cannot escape from the system 10 and pollute the environment.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A pneumatic cleaning system for particulate bulk material such as raisins, seeds, nuts and the like comprising:

A. a cleaning station;

B. means for continuously conveying such material in an air pervious, substantially horizontal, layer through the cleaning station; and C. a closed circuit having a blower providing an exhaust adapted to direct an air stream upwardly through the layer at the cleaning station as well as an intake adapted to draw air upwardly through the layer at the cleaning station, the circuit also having an air cleaner and, means connecting the cleaner, blower and cleaning station in substantially air-tight series relation.

2. The system of claim 1 wherein the material includes debris which is lifted upwardly in the air stream from the balance of the material and wherein the blower intake has an opening disposed in upwardly juxtapositioned relation to the layer at the cleaning station through which the stream and the debris therein are drawn upwardly from the layer and toward the cleaner.

3. The system of claim 2 wherein the intake includes a barrier mounted adjacent to the opening for adjustable movement toward the layer to confine the stream and the debris against movement along the layer.

4. The system of claim 1 wherein the conveying means comprises

A. a substantially horizontal perforate element extended through the station,

B. means for depositing such material to be cleaned in such layer onto the perforate element at one side of the station, C. means for continuously reciprocating the perforate element substantially horizontally so as to move the material in an agitated condition from said one side of the station toward the other side thereof for cleaning at the station by the air stream, and D. means for receiving cleaned material from the perforate element at said other side.

5. The system of claim 4 wherein the material to be cleaned contains debris which is lifted in the air stream from the balance of the material when the material is agitated and wherein A. said horizontal element is a pan having a perforate section extending transversely of a line between said side and a pair of imperforate sections contiguous to the perforate section disposed oppositely thereof along said line, B. the exhaust is connected to the lower side of the perforate section so that, as a result of the agitated condition and the air stream, the debris is urged upwardly thereby from the layer, and C. the intake includes a duct terminating at an opening generally conforming horizontally to the perforate section and upwardly juxtapositioned to the layer so that air from said stream is drawn into the intake together with debris urged upwardly from the layer, the debris being subsequently removed from the stream in the air cleaner.

6. A pneumatic cleaning system for particulate bulk material, such as raisins, seeds, nuts and the like containing debris liftable in an air stream from the balance of the material when the material is agitated, the system comprising:

A. a cleaning station having opposite sides;

B. means for continuously conveying such material in an air pervious, substantially horizontal layer through the cleaning station from one side thereof toward the other side thereof, such conveying means having (1) a substantially horizontal pan extending through the station and having a perforate section extending transversely of a line between said sides and a pair of imperforate sections which are contiguous to the perforate section and are disposed oppositely thereof in a direction along said line, (2) means for depositing such material to be cleaned in such layer onto the pan at said one side of the station, (3) means for continuously reciprocating the pan substantially horizontally so as to move such material in an agitated condition from said one side of the station toward said other side thereof for cleaning at the station, and (4) means for receiving cleaned material from the pan at said other side of the station;

C. a closed circuit having (1) a blower providing an exhaust which is connected to the lower side of the perforate section and is adapted to direct an air stream upwardly through the layer at the cleaning station so that, as a result of such agitated condition and the air stream, the debris is urged upwardly thereby from the layer and the blower providing an intake which is adapted to draw air upwardly through the layer at the cleaning station and which has a duct terminating at an opening conforming generally horizontally to the perforate section and upwardly juxtapositioned to the layer so that air from said stream is drawn into the intake together with debris urged upwardly from the layer, (2) an air cleaner, and (3) means connecting the air cleaner, the blower, and the cleaning station in substantially air-tight series relation so that such debris urged upwardly from the layer is subsequently removed from said stream in the air cleaner; and D. a hood disposed upwardly of the pan and horizontally circumscribing said perforate section and said opening, the hood being connected in substantially air-tight relation to the pan and to the duct.

7. The system of claim 6 wherein the hood extends oppositely of said perforate section along said line and wherein A. the means for depositing the material includes an input air lock opening through the hood and upwardly of the pan toward said one side of the station from said section, and B. the means for removing the cleaned material includes an outlet air lock opening through the hood disposed below the pan toward said other side of the station from said section.

8. A pneumatic cleaning system for particulate bulk material, such as raisins, seeds, nuts and the like, containing debris liftable in an air stream from the balance of the material when the material is agitated, the system comprising:

A. a cleaning station having opposite sides;

B. means for continuously conveying such material in an air pervious, substantially horizontal layer through the cleaning station from one side thereof toward the other side thereof, such conveying means having (1) a substantially horizontal pan extending through the station and having a perforate section which extends transversely of a line between said sides, a pair of imperforate sections, which are contiguous to the perforate section and are disposed oppositely thereof in a direction along said line, a lower side, an upper side, and a periphery, (2) means for depositing such material to be cleaned in such layer onto the pan at said one side of the station, (3) means for continuously reciprocating the pan substantially horizontally so as to move such material in an agitated condition from said one side of the station toward said other side thereof for cleaning at the station, and (4) means for receiving cleaned material from the pan at said other side of the station;

C. a closed circuit having (1) a blower providing an exhaust which is connected to the lower side of the perforate section and is adapted to direct an air stream upwardly through the layer at the cleaning station so that, as a result of such agitated condition and the air stream, the debris is urged upwardly thereby from the layer and the blower providing an intake which is adapted to draw air upwardly through the layer at the cleaning station and which has a duct terminating at an opening conforming generally horizontally to the perforate section and upwardly juxtapositioned to the layer so that air from said stream is drawn into the intake together with debris urged upwardly from the layer, (2) an air cleaner, and (3) means connecting the air cleaner, the blower, and the cleaning station in substantially air-tight series relation so that such debris urged upwardly from the layer is subsequently removed from said stream in the air cleaner;

D. a flexible conduit interconnecting the exhaust and said lower side in substantially air-tight relation for delivery of the air stream to the perforations in the perforate section; and E. a hood disposed above said upper side and interconnected in air-tight relation to such periphery.

9. A pneumatic cleaning system for particulate bulk material, such as raisins, seeds, nuts and the like, containing debris liftable in an air stream from the balance of the material when the material is agitated, the system comprising:

A. a cleaning station having opposite sides;

B. means for continuously conveying such material in an air pervious, substantially horizontal layer through the cleaning station from one side thereof toward the other side thereof, such conveying means having (1) a substantially horizontal pan extending through the station and having a perforate section extending transversely of a line between said sides and a pair of imperforate sections which are contiguous to the perforate section and are disposed oppositely thereof in a direction along said line, said perforate section and said pair of contiguous imperforate sections being one of a plurality of such perforate sections and corresponding pairs of imperforate sections oppositely and individually contiguous thereto, the perforate sections being spaced along said line between the opposite sides of the cleaning station and the pan including a step extended transversely of said line between a pair of adjacent imperforate sections corresponding to a pair of adjacent perforate sections, the step being downward in a direction from said one side to said other side so that, as the material in the layer is conveyed over the step, the material tumbles thereover with the material which is upwardly in the layer in a direction toward said one side from the step being tumbled downwardly in the layer and the material which is lower in such direction being tumbled upwardly therein, (2) means for depositing such material to be cleaned in such layer onto the pan at said one side of the station, (3) means for continuously reciprocating the pan substantially horizontally so as to move such material in an agitated condition from said one side of the station toward said other side thereof for cleaning at the station, and (4) means for receiving cleaned material from the pan at said other side of the station;

C. a closed circuit having (1) a blower providing an exhaust which is connected to the lower side of each of the perforate sections and is adapted to direct an airstream upwardly through the perforate sections and the layer at the cleaning station so that, as a result of such agitated condition and the airstream, the debris is urged upwardly thereby from the layer and the blower providing an intake which is adapted to draw air upwardly through the layer at the cleaning station and which has a plurality of ducts individual to the perforate sections and terminating at individual openings conforming generally horizontally to the corresponding perforate sections and upwardly juxtapositioned to the layer so that air from said stream is drawn into the intakes together with debris urged upwardly from the layer, (2) an air cleaner, and (3) means connecting the air cleaner, the blower, and the cleaning station in substantially air-tight series relation so that such debris urged upwardly from the layer is subsequently removed from said stream in the air cleaner.

10. A pneumatic closed circuit cleaning system for particulate bulk material such as raisins, seeds, nuts and the like containing debris comprising A. a reciprocating screen having opposite ends;

B. means for delivering such material to one end of the screen for travel to the opposite end as a result of the reciprocation of the screen;

C. a top hood mounted above the screen in substantially air-tight relation thereto;

D. a bottom hood mounted below the screen in substantially air-tight relation thereto;

E. an air cleaner;

F. a power driven blower having an intake and an exhaust; and

G. conduit means interconnecting the exhaust of the blower, the bottom hood, the top hood, the cleaner, and intake of the blower in closed circuit series relation.

11. The system of claim 10 wherein:

A. the screen is a portion of a substantially horizontal pan which extends oppositely from the screen along a predetermined path of travel of the material;

B. the system includes means mounting the pan for reciprocation substantially parallel to the path and powered means for continuously reciprocating the pan;

C. the top hood downwardly conforms to the periphery of the pan and is mounted on the pan in such substantially air-tight relation to said periphery;

D. the bottom hood is flexible and circumscribes the screen; and

E. the intake includes a duct extending through the hood, the duct having an open end disposed in upardly spaced, juxtapositioned, circumscribing relation to the screen and an opposite end connected to the intake of the blower.

12. The system of claim 11 wherein

A. the material delivery means includes an air lock opening through the hood outwardly of said one end of the screen through which such material passes onto the pan, and B. the system further comprises means for removing such material from said opposite end, said means including an air lock disposed outwardly of said opposite end of the screen through which said material passes from the pan.

13. The system of claim 11 wherein said open end is adjustably positionable upwardly and downwardly in relation to the screen to accommodate different thicknesses of the material traveling from the one end of the screen toward the opposite end thereof.

14. A pneumatic cleaning system for particulate bulk material including debris and desired particles, the system comprising A. a substantially air-tight enclosure, B. a pan extending horizontally across the enclosure and having a perforate section, C. first air lock means disposed at one side of the perforate section for depositing such material from the exterior of the enclosure onto the pan in a layer, D. second air lock means disposed at the other side of the perforate section for removing the desired particles to the exterior of the enclosure, E. means for reciprocating the pan horizontally in a direction between said sides so that the layer is motivated across the perforate section in an agitated condition from the one side toward the other side, F. an outlet duct disposed to direct a stream of air upwardly through the perforate section and the layer thereat, G. an inlet duct having an opening generally aligned with the perforate section and disposed in closely adjacent, upwardly spaced relation to the layer, and H. blower means for supplying such stream of air to the outlet duct to urge the debris upwardly from the desired particles in the layer and for providing a vacuum at the inlet duct to draw the upwardly urged debris from the layer.

15. The system of claim 14 wherein the blower means recirculates the air from the inlet duct to the outlet duct, and the system includes an air cleaner to separate from the recirculated air the debris drawn upwardly from the layer.

* * * * *